(12) United States Patent
Yamamoto (10) Patent No.: US 7,431,339 B2
(45) Date of Patent: Oct. 7, 2008

(54) VEHICLE STRUCTURE

(75) Inventor: Yoichi Yamamoto, West Bloomfield, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 427 days.

(21) Appl. No.: 10/933,449

(22) Filed: Sep. 3, 2004

(65) Prior Publication Data

US 2006/0049622 A1   Mar. 9, 2006

(51) Int. Cl.
    *B60R 22/22* (2006.01)
(52) U.S. Cl. .................. 280/801.1; 297/253; 297/250.1
(58) Field of Classification Search ................ 180/90.6; 280/801.1; 297/253, 254, 250.1
See application file for complete search history.

(56) References Cited

U.S. PATENT DOCUMENTS

| 3,127,652 | A | * | 4/1964 | Springer ...................... 24/165 |
| 3,375,495 | A | * | 3/1968 | Burns ....................... 340/457.1 |
| 3,428,362 | A | * | 2/1969 | Bertelson et al. ............ 297/472 |
| 3,440,602 | A | * | 4/1969 | Frig ......................... 340/457.1 |
| 4,331,349 | A | * | 5/1982 | Funahashi ................. 280/801.1 |
| 4,506,911 | A | | 3/1985 | Nakamura et al. |
| 4,986,603 | A | | 1/1991 | Hanai et al. |
| 5,060,976 | A | | 10/1991 | Boone |
| 5,415,430 | A | * | 5/1995 | Valasin ..................... 280/801.1 |
| 5,487,588 | A | * | 1/1996 | Burleigh et al. ............. 297/253 |
| 5,941,600 | A | * | 8/1999 | Mar et al. ................. 297/250.1 |
| 5,941,601 | A | * | 8/1999 | Scott et al. .................. 297/253 |
| 6,224,129 | B1 | | 5/2001 | Cisternino et al. |
| 6,234,572 | B1 | | 5/2001 | Shiino et al. |
| 6,276,754 | B1 | * | 8/2001 | Youssef-Agha et al. ..... 297/253 |
| 6,354,648 | B1 | | 3/2002 | Allan et al. |
| 6,390,560 | B1 | | 5/2002 | Gandhi et al. |
| 6,416,129 | B1 | | 7/2002 | Hirota |
| 6,447,010 | B1 | * | 9/2002 | Curtis et al. ............. 280/801.1 |
| 6,450,576 | B1 | * | 9/2002 | Rhein et al. .............. 297/250.1 |
| 6,481,800 | B2 | * | 11/2002 | Duncan .................... 297/452.2 |
| 6,485,055 | B1 | | 11/2002 | Swayne et al. |
| 6,499,786 | B2 | | 12/2002 | Takahashi |
| 6,513,873 | B2 | * | 2/2003 | Tsuda et al. ................. 297/253 |
| 6,554,357 | B2 | * | 4/2003 | Moffa ........................ 297/253 |
| 6,592,183 | B2 | * | 7/2003 | Kain .......................... 297/253 |
| 6,601,917 | B1 | | 8/2003 | Christopherson |
| 6,634,710 | B1 | * | 10/2003 | Adamson et al. ............ 297/253 |
| 6,644,692 | B2 | * | 11/2003 | Kang ....................... 280/801.1 |
| 6,729,687 | B2 | * | 5/2004 | Haverkamp ................. 297/254 |
| 6,767,057 | B2 | * | 7/2004 | Neelis ........................ 297/253 |

(Continued)

*Primary Examiner*—Lesley D. Morris
*Assistant Examiner*—Barry Gooden, Jr.
(74) *Attorney, Agent, or Firm*—Global IP Counselors, LLP (57) ABSTRACT

A vehicle structure is provided that includes a structural support member, a vehicle body panel and a child seat tether anchor. The structural support member is configured and arranged to be coupled to a vehicle body. The vehicle body panel is fixedly attached to the structural support member. The child seat tether anchor is fixedly attached to the structural support member. The child seat tether anchor includes a body panel supporting portion supporting a lower surface of the vehicle body panel and a child seat connecting portion projecting through a cutout in the vehicle body panel. Preferably, the vehicle structure is manufactured by fixedly attaching the child seat tether anchor to the structural support member, then positioning the vehicle body panel on the child seat tether anchor, and then fixedly attaching the vehicle body panel to the structural support member.

25 Claims, 9 Drawing Sheets

U.S. PATENT DOCUMENTS

| | | | |
|---|---|---|---|
| 6,827,400 B2 * | 12/2004 | Menon et al. | 297/250.1 |
| 6,869,141 B2 * | 3/2005 | Yamaoka et al. | 297/253 |
| 6,932,407 B2 * | 8/2005 | Cuerrier et al. | 296/63 |
| 7,044,548 B2 * | 5/2006 | Mullen et al. | 297/253 |
| 7,131,693 B2 * | 11/2006 | Smallwood et al. | 297/253 |
| 2001/0002087 A1 * | 5/2001 | Townsend | 280/801.1 |
| 2002/0000744 A1 * | 1/2002 | Maciejczyk | 297/254 |
| 2002/0043839 A1 * | 4/2002 | Hirota | 297/253 |
| 2002/0109382 A1 * | 8/2002 | Moffa | 297/253 |
| 2002/0190517 A1 * | 12/2002 | Kang | 280/801.1 |
| 2002/0190518 A1 * | 12/2002 | Kang | 280/801.1 |
| 2003/0160485 A1 * | 8/2003 | Mullen et al. | 297/253 |
| 2003/0184138 A1 * | 10/2003 | Haverkamp | 297/254 |
| 2003/0193226 A1 * | 10/2003 | Kain | 297/253 |
| 2004/0032154 A1 * | 2/2004 | Menon et al. | 297/253 |
| 2004/0041450 A1 * | 3/2004 | Yamaoka et al. | 297/254 |
| 2004/0051356 A1 * | 3/2004 | Neelis | 297/253 |
| 2004/0080194 A1 * | 4/2004 | Medvecky et al. | 297/253 |
| 2004/0080195 A1 * | 4/2004 | Adams et al. | 297/253 |
| 2004/0227384 A1 * | 11/2004 | Smallwood et al. | 297/253 |
| 2005/0168024 A1 * | 8/2005 | Duffy et al. | 297/253 |
| 2005/0214088 A1 * | 9/2005 | Acton | 410/3 |

* cited by examiner

VEHICLE STRUCTURE

BACKGROUND OF THE INVENTION

1. Field of the Invention

The present invention generally relates to a vehicle structure for securing a vehicle child seat thereto. More specifically, the present invention relates to a vehicle structure, which utilizes a child seat tether anchor mounted to a structural support member to facilitate positioning of a vehicle body panel and which reinforces the child seat tether anchor when the body panel is fixed to the structural support member.

2. Background Information

It is desirable to install a child seat on a vehicle seat when children ride in automobiles. Typically, the child seat was attached to the vehicle seat using one of the passenger seat belts. More recently, vehicles have been equipped with additional anchor points to comply with the ISO FIX type child system, which requires two lower (side) child seat anchors and one rear (central) tether anchor for securing a forward facing child seat to the vehicle at three locations. A rearward facing child seat is usually secured to the seat by using only the two lower (lateral) child seat anchors, while a forward facing child seat uses the lower (lateral) child seat anchors and one of the rear (central) child seat anchors.

The two lower child seat anchors are coupled to latches provided at the bottom corners of the child seat, while the rear (central) tether anchor is coupled to a tether that is attached to the upper end of the child seat. The child seat anchors are typically inverted U-shaped mounting members that are rigidly secured to the vehicle frame, body and/or uni-body. Depending on the type of vehicle construction and the desired mounting locations of the child tether anchors, reinforcement members are sometimes needed to reinforce the child tether anchors. In other words, the locations of the tether anchors often depend upon the construction of the vehicle or requires additional reinforcement members to accommodate preferred locations of child tether anchors. For example, a sport utility vehicle often has the rear (central) tether anchors located on the rear cross member located at the rear hatch.

One example of lower child seat anchors is disclosed in U.S. Pat. No. 6,499,786. Examples of tether anchors are disclosed in U.S. Pat. Nos. 6,485,055 and 6,416,129.

In view of the above, it will be apparent to those skilled in the art from this disclosure that there exists a need for an improved vehicle structure. This invention addresses this need in the art as well as other needs, which will become apparent to those skilled in the art from this disclosure.

SUMMARY OF THE INVENTION

Since child seat tether anchors are typically not merely fixed to a body panel that is constructed of sheet metal structure, vehicles are often constructed with structural supports at the prescribed locations for reinforcing the tether anchors. In other words, the prescribed locations of the tether anchors often dictate the construction of the vehicle body to at least some extent. In particular, the tether anchors need to be fixedly secured to a rigid support structure in which the tether anchors will remain affixed in the event of a collision. If the vehicle body does not have any rigid support structure in the area where it is desirable to mount the tether anchors, then an additional rigid support structure must be added for securing the tether anchor at the prescribed location. Such an additional support structure adds to the weight of the vehicle and increases the cost of manufacturing the vehicle.

In view of the foregoing, one object of the present invention is to provide a vehicle structure with a child seat tether anchor that provides a manufacturing benefit during assembly process.

Another object of the present invention is to provide a vehicle structure with a child seat tether anchor that does not require additional reinforcement, and thus does not add extra weight or cost to the vehicle.

Another object of the present invention is to provide a vehicle structure with a child seat tether anchor that provides freedom to different layouts within the vehicle.

Yet another object of the present invention is to provide a vehicle structure with a child seat tether anchor that helps the body assembly process by using the tether anchor to reduce assembly variation between the support member and the body panel, which are fixed together during the body assembly process.

The foregoing objects can basically be achieved by providing a vehicle structure that comprises a structural support member, a vehicle body panel and a first child seat tether anchor. The structural support member is configured and arranged to be coupled to a vehicle body. The vehicle body panel is fixedly attached to the structural support member. The first child seat tether anchor is fixedly attached to the structural support member. The first child seat tether anchor includes a supporting portion supporting a lower surface of the vehicle body panel and a child seat connecting portion projecting through a cutout in the vehicle body panel.

The foregoing objects can also basically be attained by providing a method of manufacturing a vehicle structure that comprises fixedly attaching a first child seat tether anchor to a structural support member that is configured and arranged to be coupled to a vehicle body, positioning a vehicle body panel on the first child seat tether anchor such that a supporting portion of the first child seat tether anchor supports a lower surface of the vehicle body panel and such that a child seat connecting portion of the first child seat tether anchor projects through a cutout in the vehicle body panel, and fixedly attaching the vehicle body panel to the structural support member.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIGS. 1-4, a vehicle 10 is illustrated that is equipped with a vehicle uni-body 11 that includes a vehicle structure 12 in accordance with the present invention, as explained below. The vehicle structure 12 is formed by at least one child seat tether anchor 14, at least one structural support member 16 of the uni-body 11 and at least one body panel 18 attached to the uni-body 11.

The term "uni-body" as used herein refers to a relatively lightweight unitized body and/or space frame that is absent a heavy rectangular chassis, and that is composed of a plurality of structural support members that form the overall skeleton and frame of the vehicle 10. However, it will be apparent to those skilled in the art from this disclosure that the vehicle structure 12 of the present invention can be utilized in constructions such as a typical frame/chassis constructions with the body mounted on top of the frame/chassis as well as combined structures which utilize "uni-body" construction with one or more sub-frame components coupled thereto. The term "structural support member" as used herein refers a non-planar member that is part of the uni-body 11 and provides at least some structural support for the vehicle 10, and excludes the body panels that are attached to the vehicle uni-body 11.

Referring to FIGS. 2-6, the vehicle structure 12 of the present invention basically includes a pair of the child seat tether anchors 14, the structural support member 16 and the vehicle body panel 18, which are fixedly coupled together as integral parts of the vehicle structure 12. The tether anchors 14 are preferably directly fixed to the structural support member 16 at predetermined locations to form a cantilever attachment with respect to the structural support member 16 prior to fixedly attaching the body panel 18 to the structural support member 16. Moreover, the body panel 18 is preferably fixedly attached to the structural support member 16 prior to fixedly attaching the body panel 18 to the tether anchors 14. Thus, the body panel 18 is permanently fixed to the structural support member 16 such that the body panel 18 becomes integral with the uni-body 11. In this embodiment, the vehicle body panel 18 is a floor panel.

With this construction, the tether anchors 14 can be utilized to orient/locate the vehicle body panel 18 in accordance with the present invention, as explained below in more detail. Then, once the vehicle body panel 18 is oriented/located using the tether anchors 14, the body panel 18 is fixedly attached to the structural support member 16 and the tether anchors 14 in order to structurally reinforce the tether anchors 14 in accordance with the present invention, as also explained below in more detail. Thus, the vehicle body panel 18 can be reliably oriented/located during the assembly process, and additional separate reinforcing elements for the tether anchors 14 can be omitted. Accordingly, weight of the vehicle structure 12 and the uni-body 11 can be minimized without sacrificing strength. Moreover, assembly variations between the body panel 18 and the structural support member 16 can be minimized.

Figure 1:
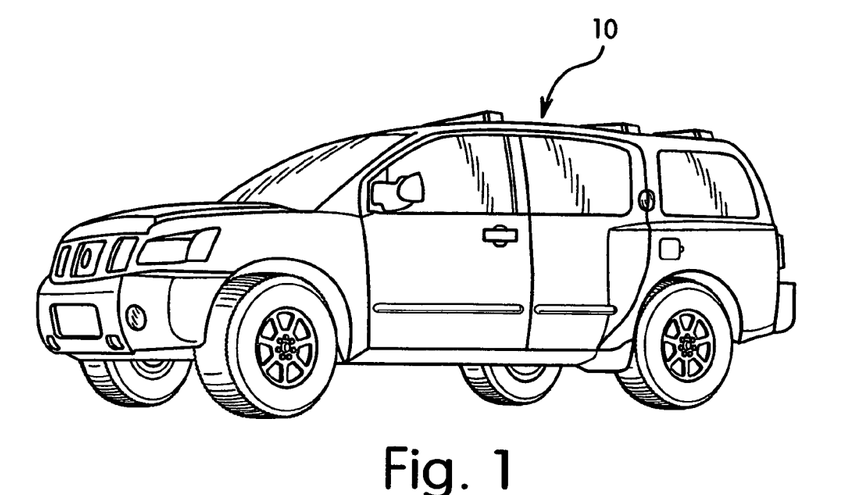
FIG. 1 is a side perspective view of a vehicle, which has a vehicle uni-body with a pair of child seat tether anchors coupled thereto in accordance with a first preferred embodiment of the present invention.
Figure 2:
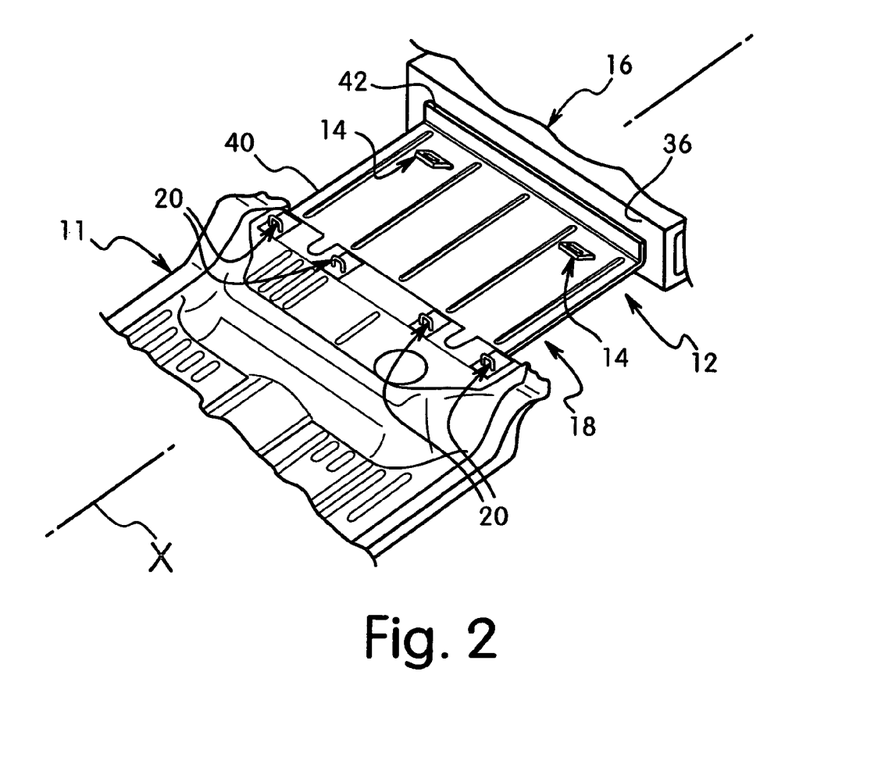
FIG. 2 is a perspective view of a portion of the vehicle uni-body (i.e., a vehicle structure) of the vehicle illustrated in FIG. 1 with the two child tether anchors coupled thereto in accordance with the present invention.
Figure 3:
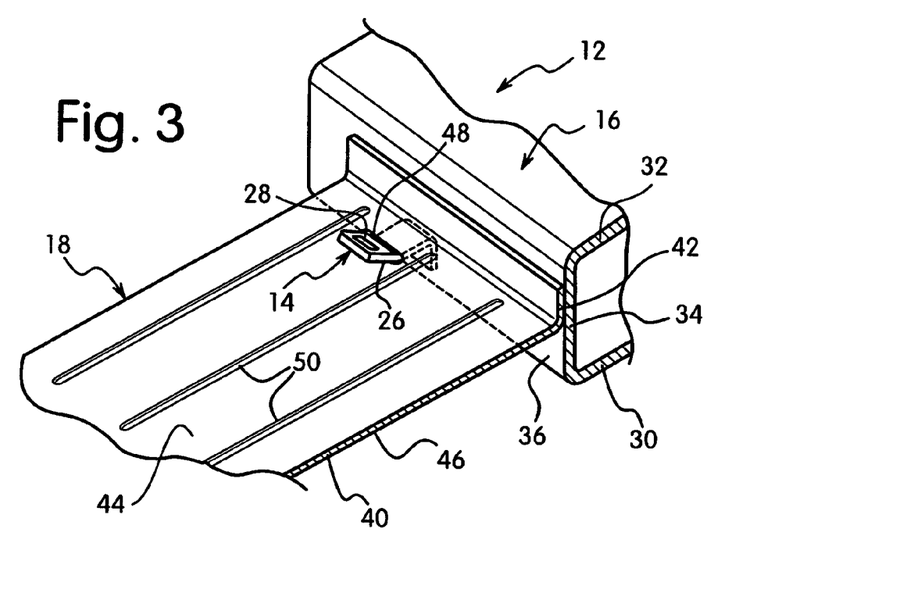
FIG. 3 is an enlarged, partial perspective view of the vehicle uni-body (i.e., the vehicle structure) illustrated in FIG. 2.
Figure 4:
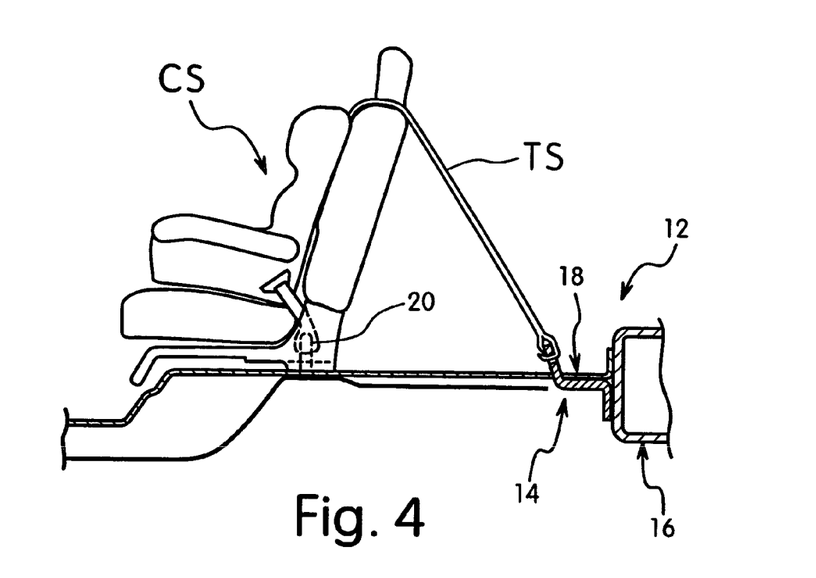
FIG. 4 is a partial, cross-sectional view of the vehicle uni-body illustrated in FIGS. 2 and 3 as seen along section line 4-4 of FIG. 3, with a vehicle seat coupled to the vehicle uni-body that has a child safety seat coupled thereto.

Two pairs of additional, conventional child seat tether anchors 20 are preferably fixedly attached to the vehicle uni-body 11 in a conventional manner, as best shown in FIG. 2. One pair of the conventional additional tether anchors 20 and one of the child seat tether anchors 14 are utilized to rigidly secure a child seat CS to the uni-body 11 of the vehicle 10 at three different locations in accordance with the present invention. The parts of the vehicle 10 and the vehicle uni-body 11 such as the child seat CS and the additional tether anchors 20 are conventional, except for the vehicle structure 12. Thus, the remaining parts of the vehicle 10 and the uni-body 11 will not be discussed and/or illustrated in detail herein, except as related to the vehicle structure 12 of the present invention. Rather, it will be apparent to those skilled in the art from this disclosure that various modifications can be made and/or various conventional vehicle parts can be used in conjunction with the vehicle structure 12 of the present invention.

Referring now to FIGS. 2-9, the vehicle structure 12 will now be explained in more detail. Preferably, the child seat tether anchors 14, structural support member 16 and the vehicle body panel 18 are formed as separate metal members that are individually metal bonded to each other. For example, the child seat tether anchors 14, the structural support member 16 and the vehicle body panel 18 are preferably welded together. In the illustrated embodiment, the structural support member 16 is a rear cross member that extends in a transverse direction relative to a longitudinal vehicle center axis X, while the vehicle body panel 18 is preferably a floor panel. The child seat tether anchors 14 each have a substantially uniform thickness $T_1$, the structural support member 16 has a substantially uniform thickness $T_2$ and the vehicle body panel 18 has a substantially uniform thickness $T_3$. The thickness $T_1$ is preferably larger than the thickness $T_2$. The thickness $T_2$ is preferably larger than the thickness $T_3$. The thicknesses $T_1$, $T_2$ and $T_3$ as well as the shapes of the child seat tether anchors 14, the structural support member 16 and the body panel 18 are configured to provide sufficient strength, without additional undesirable weight.

Figure 7:
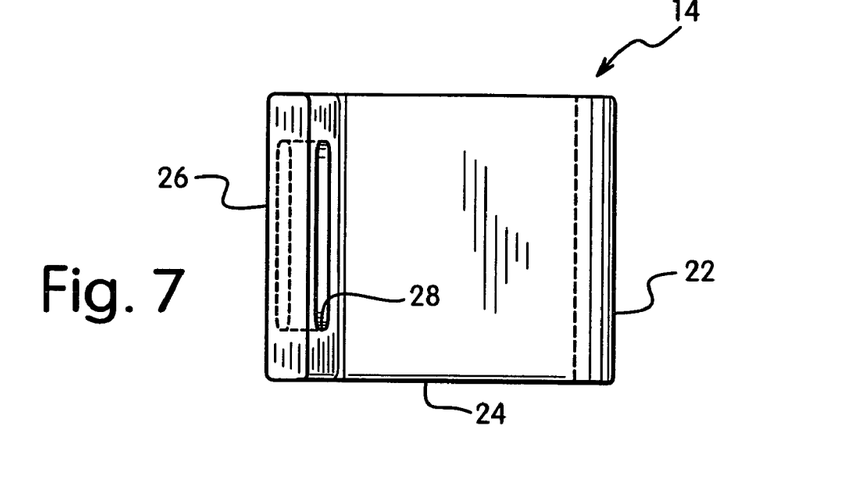
FIG. 7 is an enlarged top plan view of the child seat tether anchor (plate) of the vehicle structure illustrated in FIGS. 2-6.
Figure 8:
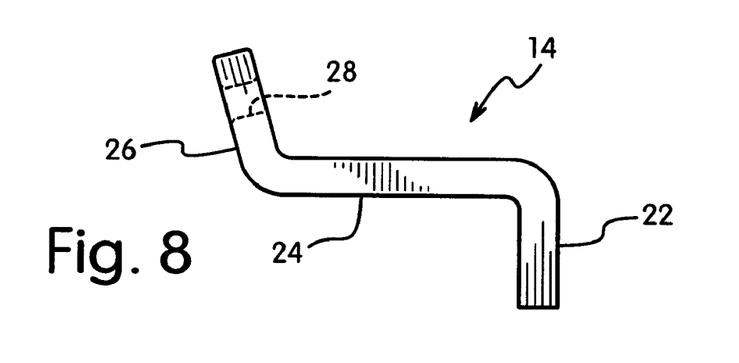
FIG. 8 is a lateral side elevational view of the child seat tether anchor illustrated in FIG. 7.
Figure 9:
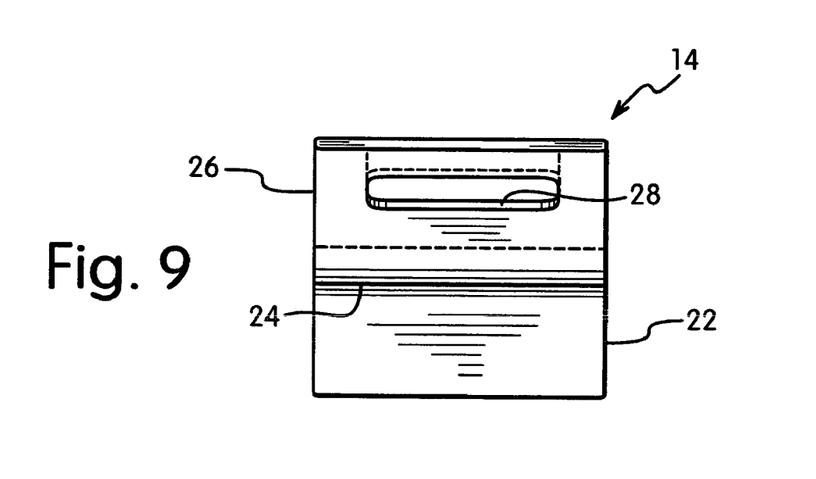
FIG. 9 is a front side elevational view of the child seat tether anchor illustrated in FIGS. 7 and 8.

Referring to FIGS. 2-9, each of the child seat tether anchors 14 is preferably a somewhat Z-shaped plate that is constructed of a rigid metallic material, as best seen in FIG. 7. The child seat tether anchors 14 are identical. Thus, only one of the child seat tether anchors 14 will be discussed and illustrated in detail herein. Each child seat tether anchor 14 basically includes a structural mounting portion 22, a body panel supporting portion 24 and a child seat connecting portion 26. The structural mounting portion 22, the body panel supporting portion 24 and the child seat connecting portion 26 are preferably integrally formed together as a one-piece, unitary member.

The structural mounting portion 22 is fixedly attached to the structural support member 16 (e.g. by welding), while the body panel supporting portion 24 supports the vehicle body panel 18 during the orienting/locating of the body panel 18 relative to the structural support member 16. In other words, in this embodiment, the structural mounting portion 22 is generally vertically oriented, while the body panel supporting portion 24 extends generally horizontally from the structural mounting portion 22. The body panel supporting portion 24 is later fixedly attached to the body panel 18 (e.g. by welding). In particular, the body panel supporting portion 24 includes an upper (or planar) surface making planar contact with a lower (or planar) surface 46 of the vehicle body panel 18. The child seat connecting portion 26 is configured and arranged to have a child seat tether member or strap TS coupled thereto in a relatively conventional manner. Specifically, the child seat connecting portion 26 has an attachment hole 28 formed therein for coupling the tether member TS therein. The attachment hole 28 is defined by a continuous surface of the child seat connecting portion 26 located above the vehicle body panel 18.

When the child seat tether anchor 14, the structural support member 16 and the body panel 18 are fixedly coupled together, the body panel supporting portion 24 is substantially horizontally oriented with the structural mounting portion 22 extending substantially downwardly from one end of the body panel supporting portion 24 and the child seat connecting portion 26 extending substantially upwardly from the other end of the body panel supporting portion 24. In particular, the child seat connecting portion 26 extends upwardly at a slight angle relative to the vertical direction the child seat connecting portion 26 is obtusely or acutely angled with respect to the body panel supporting portion 24), while the structural mourning portion 22 extends substantially vertically.

Referring again to FIGS. 2-6, the structural support member 16 of the uni-body 11 is preferably a partially box-shaped member that is constructed of deformed sheet metal material. As mentioned above, the thickness $T_2$ of the structural support member 16 is preferably smaller than the thickness $T_1$ of the child seat tether anchors 14. The structural support member 16 basically includes a lower horizontal section 30, an upper horizontal section 32 and a vertical section 34 having a vertical mounting surface 36. Preferably, the lower horizontal section 30, the upper horizontal section 32 and the vertical section 34 are integrally formed together as a one-piece, unitary member from a single piece of metal sheet material. Moreover, the structural support member 16 preferably has a substantially constant cross-sectional shape along its transverse length.

The structural mounting portion 22 of each child seat tether anchor 14 is fixedly attached to the vertical surface 36 of the vertical section 34 (e.g. by welding) at a predetermined vertical position such that the body panel supporting portion 24 is substantially horizontal. Due to this configuration, the vehicle body panel 18 (floor) can be more precisely located relative to the structural support member 16, and can be mounted lower relative to the upper horizontal section 30 of the structural support member 16 (i.e., relatively closer to the ground).

Referring still to FIGS. 2-6, the vehicle body panel 18 is preferably a substantially L-shaped member that is constructed of deformed sheet metal material. As mentioned above, the thickness $T_3$ of the body panel 18 is typically smaller than the thickness $T_2$ of the structural support member 16. The body panel 18 basically includes a horizontal floor section 40 and a vertical mounting section 42. The mounting section 42 is fixedly attached to the vertical mounting surface 36 of the structural support member 16 (e.g. by welding) after the child seat tether anchors 14 are fixed to the vertical mounting surface 36. Preferably, the floor section 40 and the mounting section 42 are integrally formed together as a one-piece, unitary member. However, it will be apparent to those skilled in the art from this disclosure that the body panel 18 can have other configurations as needed and/or desired. For example, it will be apparent to those skilled in the art from this disclosure that the body panel 18 could be formed of two separate members that are mounted side by side.

Figure 5:
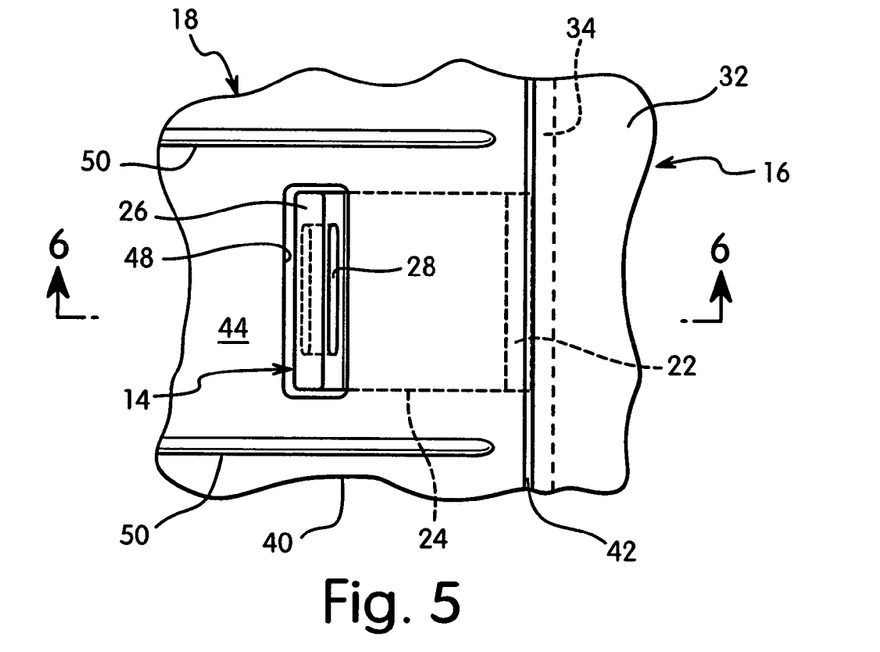
FIG. 5 is an enlarged, partial top plan view of the vehicle uni-body (i.e., the vehicle structure) illustrated in FIGS. 2-4.
Figure 6:
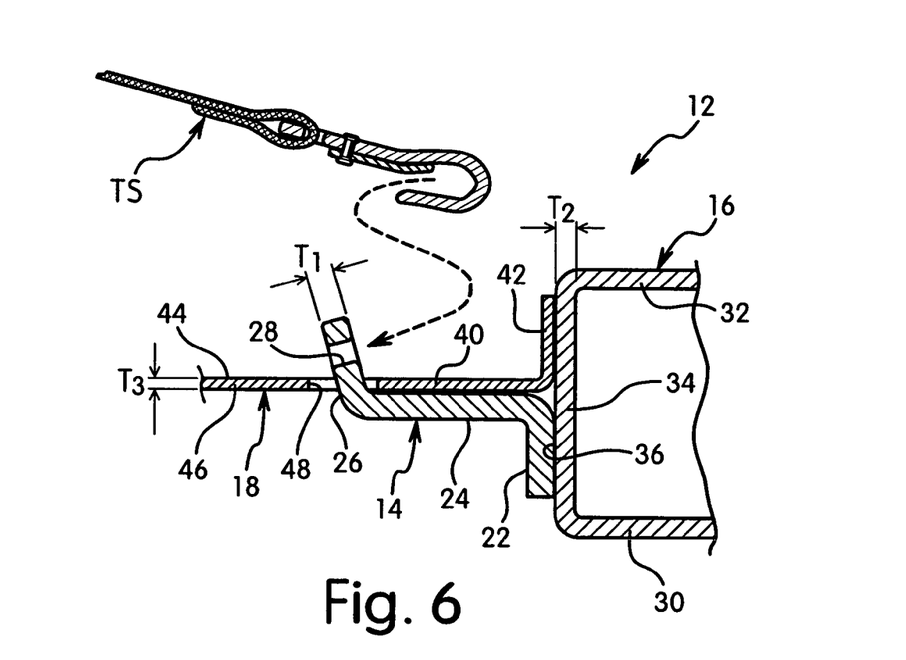
FIG. 6 is a cross-sectional view of the portion of the vehicle uni-body (i.e., the vehicle structure) illustrated in FIG. 5 as seen along section line 6-6 of FIG. 5, with a child seat tether illustrated in a detached position for the purpose of illustration.

The floor section 40 has an upper surface 44, a lower surface 46 and a pair of cutouts 48 extending between the upper and lower surfaces 44 and 46. Moreover, the floor section 40 is preferably provided with longitudinal reinforcing ridges 50. Each of the cutouts 48 is configured and arranged to receive the child seat connecting portion 26 of one of the child seat tether anchors 14 therethrough. As viewed from above (e.g., as seen in FIG. 5), each cutout 48 is slightly larger than the child seat connecting portion 26 of each child seat tether anchor 14. Thus, the body panel 18 can be moved downwardly (with the floor section horizontally oriented) during the assembly process until the lower surface 46 is directly supported on the body panel supporting portion 24. However, it will be apparent to those skilled in the art from this disclosure that the cutouts 48 in this embodiment can be smaller (e.g. only slightly larger than the child seat connecting portions 26 as viewed along the angled child seat connecting portions 26).

When the lower surface 46 is supported on the body panel supporting portions 24, the child seat connecting portions 26 project through the cutouts 48 in a laterally spaced arrangement such that the attachment holes 28 are accessible for the tether member TS. Due to the configuration of the cutouts 48 and the child seat connecting portions 26, the body panel 18 is not only oriented vertically relative to the structural support member 16, but also laterally in a reliable consistent manner. In other words, due to the configuration of the cutouts 48, the child seat connecting portion 26, the vertical mounting section 42 and the vertical section 34, the longitudinal location/orientation of the body panel 18 relative to the structural support member 16 is achieved in a reliable consistent manner.

After the body panel 18 is properly oriented, the mounting section 42 is fixedly attached to the vertical section 34 of the structural support member 16, while the floor section 40 is fixedly attached to the body panel supporting portions 24 of the child seat tether anchors 14. Once these parts are attached together, the body panel 18 structurally reinforces the child seat tether anchor 14. Of course, it will be apparent to those skilled in the art from this disclosure that the body panel 18 provides some structural reinforcement for the child seat tether anchors 14 (i.e. from moving upwardly in the vertical direction), even if the body panel 18 is not fixedly attached to the child seat tether anchors 14. In any case, the body panel 18 is preferably fixedly attached to the child seat tether anchors 14 to provide optimal reinforcement thereto.

Figure 10:
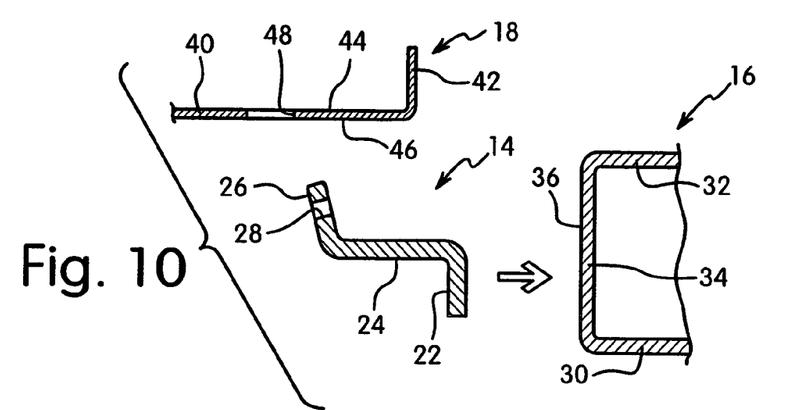
FIG. 10 is a partial cross-sectional view of portions of the vehicle uni-body (i.e., the vehicle structure) illustrated in FIGS. 2-6, prior to assembly.
Figure 11:
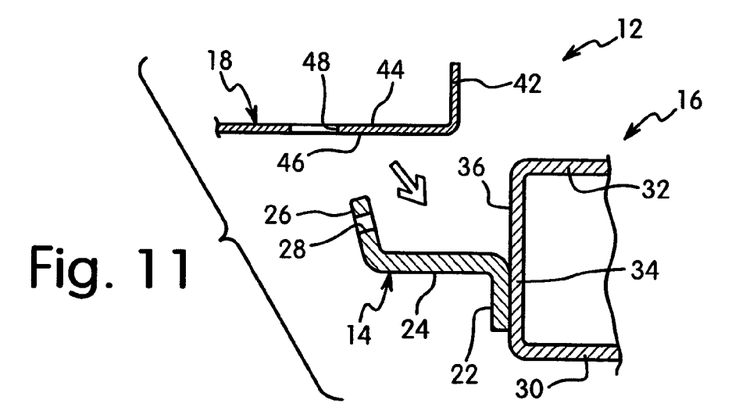
FIG. 11 is a partial cross-sectional view of the portions of the vehicle uni-body (i.e., the vehicle structure) illustrated in FIG. 10 at an intermediate assembly stage.
Figure 12:
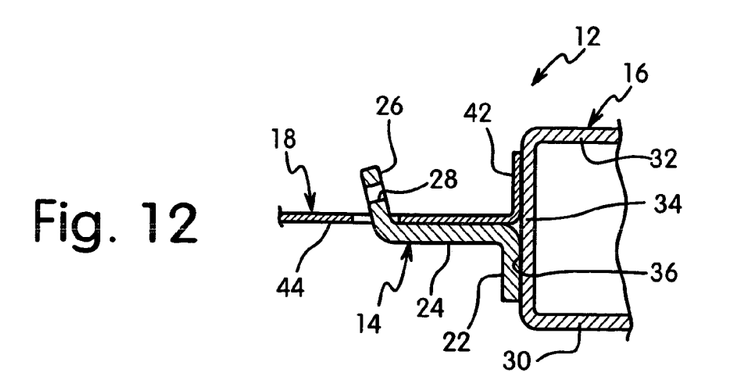
FIG. 12 is a partial cross-sectional view of the portions of the vehicle uni-body (i.e., the vehicle structure) illustrated in FIGS. 10 and 11, after complete assembly.
Figure 13:
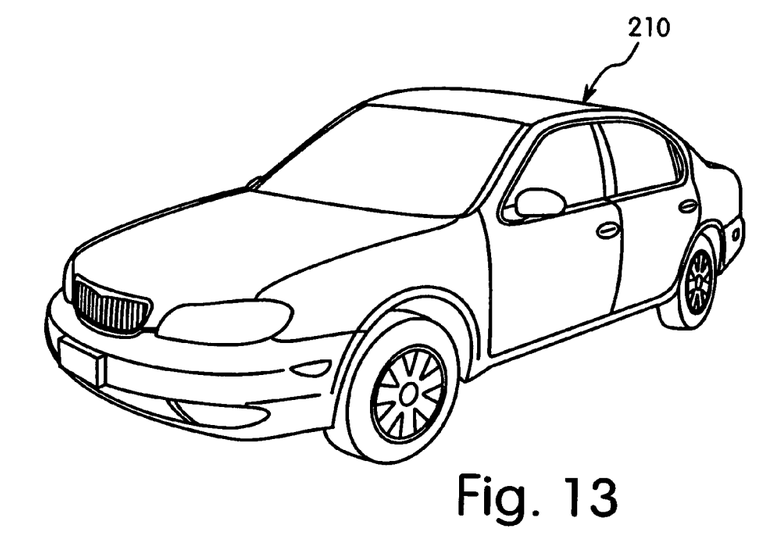
FIG. 13 is a side perspective view of a vehicle, which has a vehicle uni-body with a pair of child seat tether anchors coupled thereto in accordance with a second preferred embodiment of the present invention.

The manufacturing process for the vehicle structure 12 in accordance with the present invention will now be discussed in more detail with reference to FIGS. 10-12. First, the child seat tether anchors 14, the structural support member 16 and the body panel 18 are preferably formed into the shapes illustrated herein in a conventional manner, as seen in FIG. 10. As mentioned above, during the assembly process, the tether anchors 14 are preferably fixedly attached to the structural support member 16 at predetermined locations prior to fixedly attaching the body panel 18 to the structural support member 16 as best seen in FIG. 11. The locations of the tether anchors 14 are laterally spaced and preferably vertically spaced downwardly from the upper surface 44 of the structural support member 16. The body panel 18 is then positioned on the body panel supporting portions 24 of the child seat tether anchors 14 such that the child seat connecting portions 26 project through the cutouts 48 of the body panel 18. Then, the body panel 18 is preferably fixedly attached to the structural support member 16 and to the child seat tether anchors 14.

Preferably, the tether anchors 14, the structural support member 16 and the body panel 18 are fixedly attached to each other by welding such that each piece is individually affixed to each other. More specifically, opposing (i.e. contacting) surfaces of the tether anchors 14, the structural support member 16 and the body panel 18 are preferably fixedly attached to each other by spot welding or other metal bonding method. Of course, it will be apparent to those skilled in the art from this disclosure that the order of attaching the body panel 18 to the child seat tether anchors 14 and the structural support member 16 can be accomplished in any order if needed and/or desired. Moreover, it will be apparent to those skilled in the art from this disclosure that other attachment techniques could be utilized in accordance with the present invention.

Second Embodiment

Referring now to FIGS. 13-21, a vehicle 210 is illustrated that is equipped with a vehicle uni-body 211 that includes a vehicle structure 212 in accordance with a second embodiment of the present invention will now be explained. The vehicle structure 212 is formed by at least one child seat tether anchor 214, at least one structural support member 216 of the uni-body 211 and at least one body panel 218 attached to the uni-body 211. The second embodiment is very similar to the first embodiment, except that the vehicle structure 212 of this second embodiment is a modified version of the vehicle structure 12 of the first embodiment. In particular, the vehicle structure 212 is formed as part of the rear deck panel that is located behind the rear passenger seat, instead of the floor panel as in the first embodiment. In view of the similarity between the first and second embodiments, the parts of the second embodiment that are functionally identical to the parts of the first embodiment will be given the same reference numerals as the parts of the first embodiment, but with "200" added thereto. Identical items will be given identical reference numerals/characters. Moreover, the descriptions of the parts of the second embodiment that are functionally identical to the parts of the first embodiment will be abridged for the sake of brevity. However, it will be apparent to those skilled in the art from this disclosure that the descriptions and illustrations of the first embodiment also apply to this second embodiment, except as explained and illustrated herein.

Referring to FIGS. 14-18, the vehicle structure 212 of the present invention basically includes a pair of the child seat tether anchors 214, the structural support member 216 and the vehicle body panel 218, which are fixedly coupled together as integral parts of the vehicle structure 212. The tether anchors 214 are preferably directly fixed to the structural support member 216 at predetermined locations to form a cantilever attachment with respect to the structural support member 216 prior to fixedly attaching the body panel 218 to the structural support member 216. The body panel 218 is then preferably fixedly attached to the structural support member 216 and fixedly attached to the tether anchors 214. Thus, the body panel 218 is permanently fixed to the structural support member 216 such that the body panel 218 becomes integral with the uni-body 211. In this embodiment, the vehicle body panel 218 is a rear P-shelf (i.e., deck between the rear seat and the trunk lid, below the rear window), while the structural support member 216 is a P-shelf reinforcing member.

With this construction, the tether anchors 214 can be utilized to orient/locate the vehicle body panel 218 in accordance with the present invention, as explained below in more detail. Then, once the vehicle body panel 218 is oriented/located using the tether anchors 214, the body panel 218 is fixedly attached to the structural support member 216 and the tether anchors 214 in order to structurally reinforce the tether anchors 214 in accordance with the present invention, as also explained below in more detail. Thus, the vehicle body panel 218 can be reliably oriented/located during the assembly process, and additional separate reinforcing elements for the tether anchors 214 can be omitted. Accordingly, weight of the vehicle structure 212 and the uni-body 211 can be minimized without sacrificing strength. Moreover, assembly variations between the body panel 218 and the structural support member 216 can be minimized.

Figure 14:
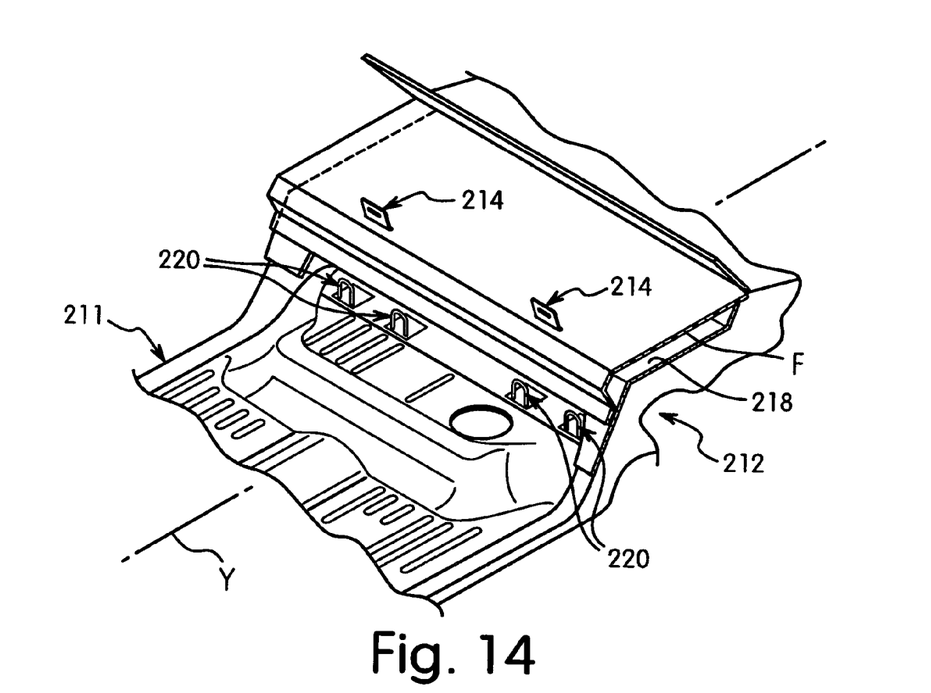
FIG. 14 is a perspective view of a portion of the vehicle uni-body (i.e., a vehicle structure) of the vehicle illustrated in FIG. 13 with the two child tether anchors coupled thereto in accordance with the present invention.

Two pairs of additional, conventional child seat tether anchors 220 are preferably fixedly attached to the vehicle uni-body 211 in a conventional manner, as best shown in FIG. 14. One pair of the conventional additional tether anchors 220 and one of the child seat tether anchors 214 are utilized to rigidly secure a child seat CS to the uni-body 211 of the vehicle 210 at three different locations in accordance with the present invention. The parts of the vehicle 210 and the vehicle uni-body 211 such as the child seat CS and the additional tether anchors 220 are conventional, except for the vehicle structure 212. Thus, the remaining parts of the vehicle 210 and the uni-body 211 will not be discussed and/or illustrated in detail herein, except as related to the vehicle structure 212 of the present invention. Rather, it will be apparent to those skilled in the art from this disclosure that various modifications can be made and/or various conventional vehicle parts can be used in conjunction with the vehicle structure 212 of the present invention.

Referring still to FIGS. 14-18, the vehicle structure 212 will now be explained in more detail. Preferably, the child seat tether anchors 214, structural support member 216 and the vehicle body panel 218 are formed as separate metal members that are individually metal bonded to each other. For example, the child seat tether anchors 214, the structural support member 216 and the vehicle body panel 218 are preferably welded together. In the illustrated embodiment, the structural support member 216 is a rear cross member that extends in a transverse direction relative to a longitudinal vehicle center axis Y to support a P-shelf, while the vehicle body panel 218 is preferably a P-shelf. Like the first embodiment, the child seat tether anchors 214 each preferably have a substantially uniform thickness $T_1$, the structural support member 216 preferably has a substantially uniform thickness $T_2$ and the vehicle body panel 218 preferably has a substantially uniform thickness $T_3$. The thickness $T_1$ is preferably larger than the thickness $T_2$. The thickness $T_2$ is preferably larger than the thickness $T_3$. The thicknesses $T_1$, $T_2$ and $T_3$ as well as the shapes of the child seat tether anchors 214, the structural support member 216 and the body panel 218 are configured to provide sufficient strength, without additional undesirable weight.

Referring still to FIGS. 14-18, each of the child seat tether anchors 214 is preferably a somewhat L-shaped plate that is constructed of a rigid metallic material. The child seat tether anchors 214 are identical. Thus, only one of the child seat tether anchors 214 will be discussed and illustrated in detail herein. Each child seat tether anchor 214 basically includes a body panel supporting portion 224 and a child seat connecting portion 226. The structural mounting portion 22 of the first embodiment is omitted in this second embodiment, and the body panel supporting portion 224 also functions as a structural mounting portion in this second embodiment. The body panel supporting portion 224 and the child seat connecting portion 226 are preferably integrally formed together as a one-piece, unitary member.

In this embodiment, the body panel supporting portion 224 is fixedly attached to the structural support member 216 (e.g. by welding). The body panel supporting portion 224 then supports the vehicle body panel 218 during the orienting/locating of the body panel 218 relative to the structural support member 216. In other words, in this embodiment, body panel supporting portion 224 extends generally horizontally, and forms the structural mounting portion of the tether anchor 214. The body panel supporting portion 224 is later fixedly attached to the body panel 218 (e.g. by welding). In particular, the body panel supporting portion 224 includes an upper (or planar) surface making planar contact with a lower (or planar) surface 246 of the vehicle body panel 218. The child seat connecting portion 226 is configured and aranged to have a child seat tether member or strap TS coupled thereto in a relatively conventional manner. Specifically, the child seat connecting portion 226 has an attachment hole 228 formed Therein for coupling the tether member TS therein. The attachment hole 228 is defined by a continuous surface of the child seat connecting portion 226 located above the vehicle body panel 218.

When the child seat tether anchor 214, the structural support member 216 and the body panel 218 are fixedly coupled together, the body panel supporting portion 224 is substantially horizontally oriented with the child seat connecting portion 226 extending substantially upwardly from the body panel supporting portion 224. In particular, the child seat connecting portion 226 extends upwardly at a slight angle relative to the vertical direction (the child seat connecting portion 226 is obtusely or acutely angled with respect to the body panel supporting portion 224).

Referring still to FIGS. 14-18, the structural support member 216 of the uni-body 211 is preferably a segmented, angulated member that is constructed of deformed sheet metal material. In particular, the structural support member 216 has a substantially L-shaped cross-sectional shape with mounting tabs extending from each end. As mentioned above, the thickness $T_2$ of the structural support member 216 is preferably smaller than the thickness $T_1$ of the child seat tether anchors 214. The structural support member 216 basically includes a lower mounting tab or flange 231, an L-shaped section 233 and an upper mounting tab or flange 235 with a horizontal mounting surface 237. Preferably, the lower mounting flange 231, the L-shaped section 233 and the upper mounting flange 235 are integrally formed together as a one-piece, unitary member from a single piece of metal sheet material. Moreover, the structural support member 216 preferably has a substantially constant cross-sectional shape along its transverse length.

The body panel supporting portion 224 of each child seat tether anchor 214 is fixedly attached to the horizontal (upper) surface 237 of the upper flange 235 (e.g. by welding) at a predetermined position such that the body panel supporting portion 224 is substantially horizontal. Due to this configuration, the vehicle body panel 218 (P-shelf) can be more precisely located relative to the structural support member 216.

Referring still to FIGS. 14-18, the vehicle body panel 218 is preferably a substantially L-shaped member that is constructed of deformed sheet metal material. As mentioned above, the thickness $T_3$ of the body panel 218 is typically smaller than the thickness $T_2$ of the structural support member 216. The body panel 218 basically includes a horizontal shelf section 241 and an inclined section 243. The inclined section 243 is preferably fixedly attached to the lower mounting flange 231 of the structural support member 216 (e.g. by welding) after the child seat tether anchors 214 are fixed to the upper mounting flange 235. Preferably, the shelf section 241 and the inclined section 243 are integrally formed together as a one-piece, unitary member. However, it will be apparent to those skilled in the art from this disclosure that the body panel 218 can have other configurations as needed and/or desired. For example, it will be apparent to those skilled in the art from this disclosure that the body panel 218 could be formed of two separate members that are mounted side by side.

Figure 17:
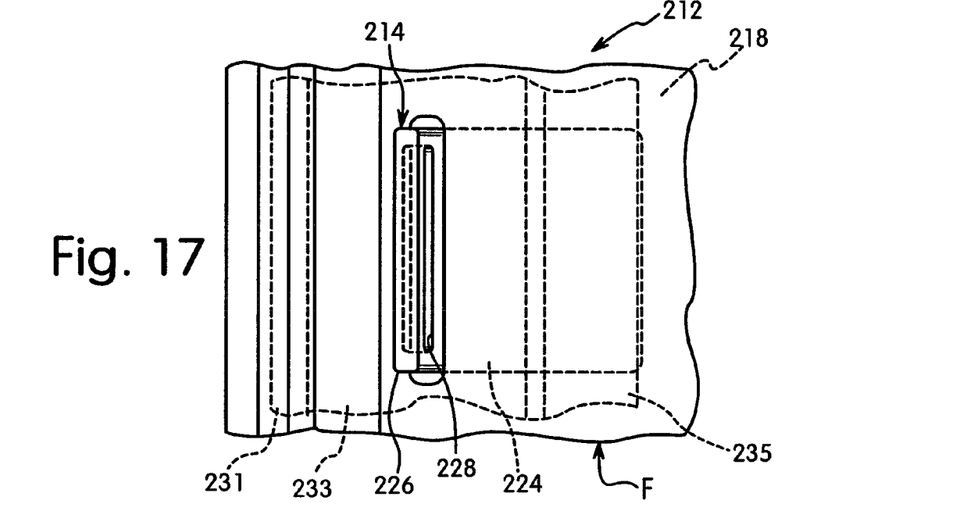
FIG. 17 is an enlarged, partial top plan view of the vehicle uni-body (i.e., the vehicle structure) illustrated in FIGS. 14-16.
Figure 18:
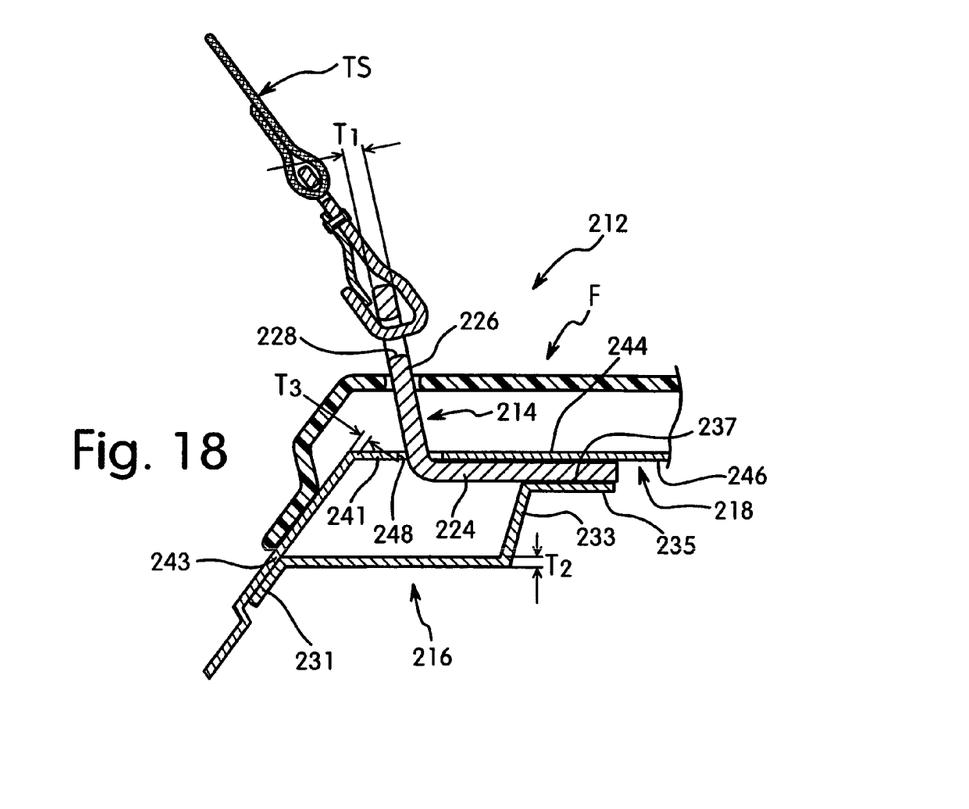
FIG. 18 is a cross-sectional view of the portion of the vehicle uni-body (i.e., the vehicle structure) illustrated in FIG. 17 as seen along section line 18-18 of FIG. 17, with a child seat tether illustrated in a detached position for the purpose of illustration.

The shelf section 241 has an upper surface 244, a lower surface 246 and a pair of cutouts 248 extending between the upper and lower surfaces 244 and 246. Each of the cutouts 248 is configured and arranged to receive the child seat connecting portion 226 of one of the child seat tether anchors 214 therethrough. As viewed from above (e.g., as seen in FIG. 17), each cutout 248 is slightly larger than the child seat connecting portion 226 of each child seat tether anchor 214. Thus, the body panel 218 can be moved downwardly (with the shelf section horizontally oriented) during the assembly process until the lower surface 246 is directly supported on the body panel supporting portion 224. It will be apparent to those skilled in the art from this disclosure that the cutouts 248 in this embodiment can be the same size as the cutouts 48 of the first embodiment, or the cutouts 248 can be smaller (e.g. only slightly larger than the child seat connecting portions 226 as viewed along the angled child seat connecting portions 226).

When the lower surface 246 is supported on the body panel supporting portions 224, the child seat connecting portions 226 project through the cutouts 248 in a laterally spaced arrangement such that the attachment holes 228 are accessible for the tether member TS. Due to the configuration of the cutouts 248 and the child seat connecting portions 226, the body panel 218 is not only oriented vertically relative to the structural support member 216, but also laterally in a reliable consistent manner. In other words, due to the configuration of the cutouts 248, the child seat connecting portions 226, the shelf section 241, the inclined section 243, the lower flange 231 and the upper flange 235, the longitudinal location/orientation of the body panel 218 relative to the structural support member 216 is achieved in a reliable consistent manner.

Figure 15:
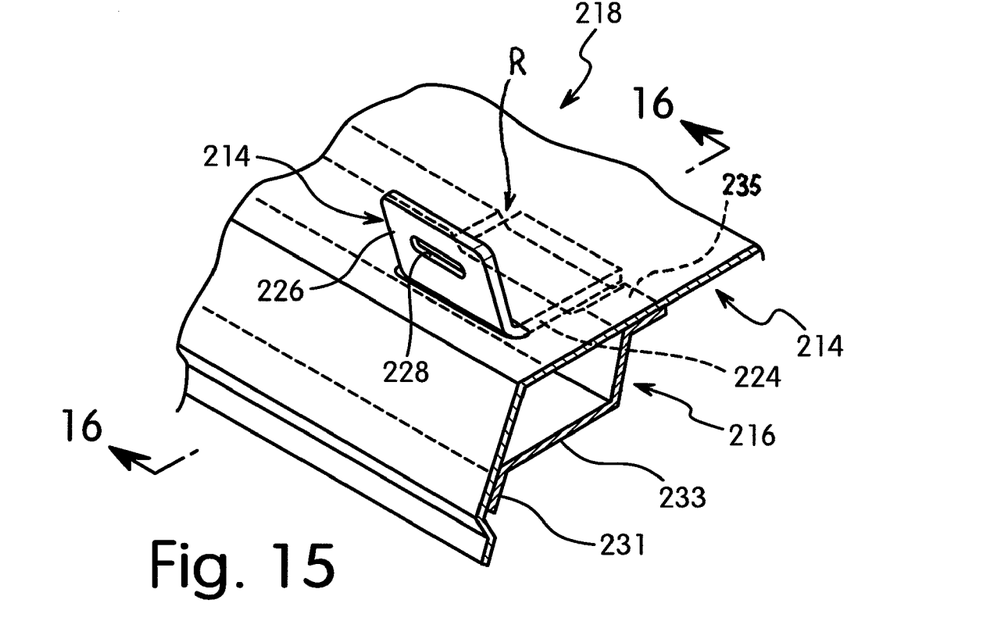
FIG. 15 is an enlarged, partial perspective view of the vehicle uni-body (i.e., the vehicle structure) illustrated in FIG. 14.
Figure 16:
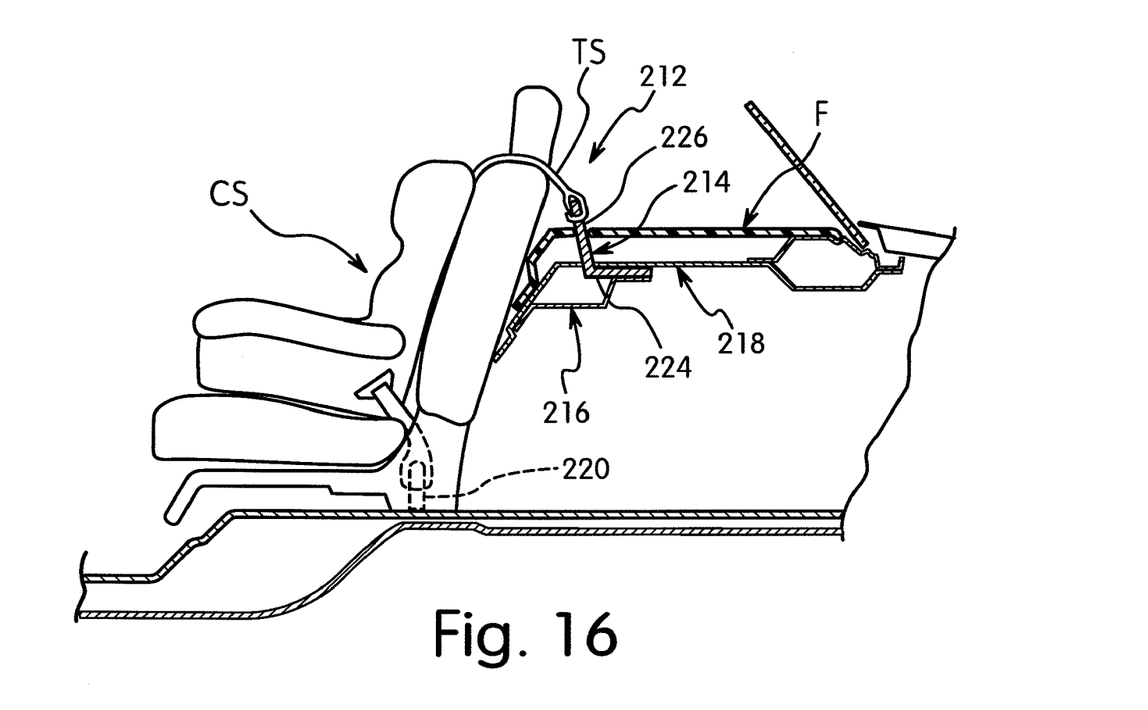
FIG. 16 is a partial, cross-sectional view of the vehicle uni-body illustrated in FIGS. 14 and 15 as seen along section line 16-16 of FIG. 15, with a vehicle seat coupled to the vehicle uni-body that has a child safety seat coupled thereto.

After the body panel 218 is properly oriented, the inclined section 243 is preferably fixedly attached to the lower flange 231 of the structural support member 216, while the shelf section 241 is fixedly attached to the upper flange 235 and to the body panel supporting portions 224 of the child seat tether anchors 214. Preferably, either the shelf section 241 and/or the upper flange 235 has a slightly undulating shape (e.g., a recess R in FIG. 15) such that the shelf section 241 contacts the upper flange 235 and the body panel supporting portions 224. Specifically, the upper flange 235 of the structural support member 216 includes the recess R. as shown in FIG. 15. The body panel supporting portion 224 is disposed in the recess R. Once these parts are attached together, the body panel 218 structurally reinforces the child seat tether anchors 214.

Figure 19:
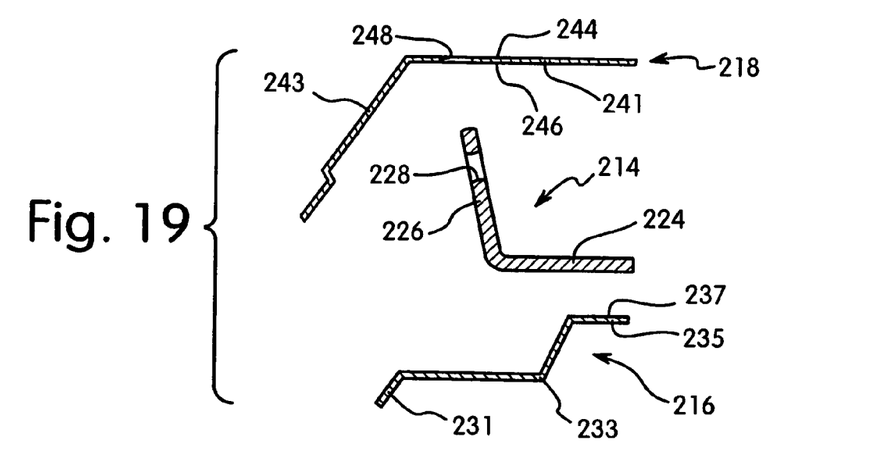
FIG. 19 is a partial cross-sectional view of portions of the vehicle uni-body (i.e., the vehicle structure) illustrated in FIGS. 14-18, prior to assembly.
Figure 20:
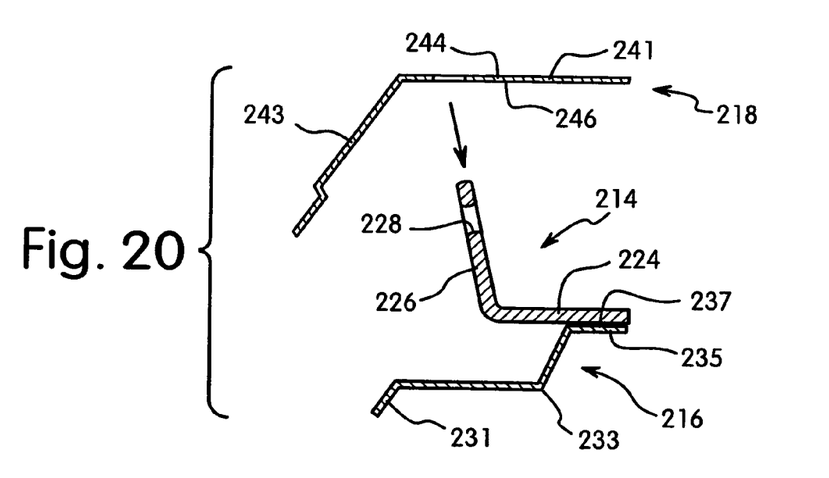
FIG. 20 is a partial cross-sectional view of the portions of the vehicle uni-body (i.e., the vehicle structure) illustrated in FIG. 19 at an intermediate assembly stage.
Figure 21:
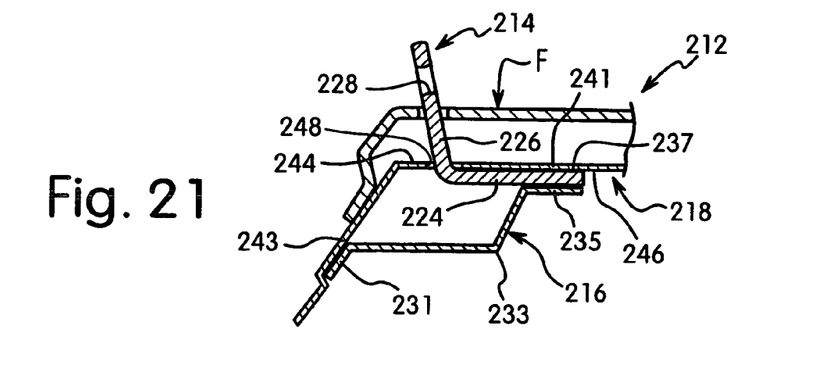
FIG. 21 is a partial cross-sectional view of the portions of the vehicle uni-body (i.e., the vehicle structure) illustrated in FIGS. 19 and 20, after complete assembly.

The manufacturing process for the vehicle structure 212 in accordance with the present invention will now be discussed in more detail with reference to FIGS. 19-21. First, the child seat tether anchors 214, the structural support member 216 and the body panel 218 are preferably formed into the shapes illustrated herein in a conventional manner, as seen in FIG. 19. The tether anchors 214 are then preferably fixedly attached to the structural support member 216 at predetermined locations prior to fixedly attaching the body panel 218 to the structural support member 216 as best seen in FIG. 20. The locations of the tether anchors 214 are laterally spaced along the structural support member 216. The body panel 218 is then positioned on the body panel supporting portions 224 of the child seat tether anchors 214 such that the child seat connecting portions 226 project through the cutouts 248 of the body panel 218. Then, the body panel 218 is preferably fixedly attached to the structural support member 216 and to the child seat tether anchors 214.

Preferably, the tether anchors 214, the structural support member 216 and the body panel 218 are fixedly attached to each other by welding such that each piece is individually affixed to each other. More specifically, opposing (i.e. contacting) surfaces of the tether anchors 214, the structural support member 216 and the body panel 218 are preferably fixedly attached to each other by spot welding or other metal bonding method. Of course, it will be apparent to those skilled in the art from this disclosure that the order of attaching the body panel 218 to the child seat tether anchors 214 and the structural support member 216 can be accomplished in any order if needed and/or desired. Moreover, it will be apparent to those skilled in the art from this disclosure that other attachment techniques could be utilized in accordance with the present invention. A finish panel F is preferably mounted over the body panel 218, as best seen in FIGS. 14, 16-18 and 21. The finish panel F is preferably constructed of plastic with some type of textile (i.e. fabric or cloth) covering.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle structure comprising:
    a structural support member configured and arranged to be coupled to a vehicle body;
    a vehicle body panel including a lower surface and an upper surface, with the vehicle body panel fixedly attached to the structural support member; and
    a first child seat tether anchor directly fixed to the structural support member at a point below the lower surface to form a cantilever attachment with respect to the structural support member, the first child seat tether anchor including a supporting portion directly contacting and supporting the lower surface of the vehicle body panel and a child seat connecting portion extending from the supporting portion with a transition formed therebetween and projecting through a cutout in the vehicle body panel, with all attachments between the vehicle body panel and the first child seat tether anchor being disposed rearward of the transition between the supporting portion and the child seat connecting portion,
    the vehicle body panel directly contacting with the structural support member at a location above the attachments between the vehicle body panel and the first child seat tether anchor;
    the first child seat tether anchor being directly fixedly attached to a substantially vertical surface of the structural support member.

2. The vehicle structure according to claim 1, wherein the vehicle body panel is fixedly attached to the first child seat tether anchor.

3. The vehicle structure according to claim 2, wherein the structural support member, the vehicle body panel and the first child seat tether anchor are formed as separate metallic members that are individually metal bonded together.

4. The vehicle structure according to claim 2, wherein the vehicle body panel is fixedly attached to the supporting portion of the first child seat tether anchor.

5. The vehicle structure according to claim 1, further comprising
    a second child seat tether anchor fixedly attached to the structural support member at a laterally spaced location from the first child seat tether anchor, the second child seat tether anchor including a second supporting portion supporting the lower surface of the vehicle body panel and a second child seat connecting portion projecting through a second cutout in the vehicle body panel.

6. The vehicle structure according to claim 1, wherein the supporting portion includes a planar surface making planar contact with a planar surface of the vehicle body panel.

7. The vehicle structure according to claim 1, wherein the child seat connecting portion is obtusely or acutely angled with respect to the supporting portion.

8. The vehicle structure according to claim 1, wherein the child seat connecting portion has an attachment hole defined by a continuous surface of the child seat connecting portion located above the vehicle body panel.

9. A vehicle structure comprising:
a structural support member configured and arranged to be coupled to a vehicle body;
a vehicle body panel including a lower surface and an upper surface, with the vehicle body panel fixedly attached to the structural support member; and
a first child seat tether anchor directly fixed to the structural support member at a point below the lower surface to form a cantilever attachment with respect to the structural support member, the first child seat tether anchor including a supporting portion directly contacting and supporting the lower surface of the vehicle body panel and a child seat connecting portion extending from the supporting portion with a transition formed therebetween and projecting through a cutout in the vehicle body panel, with all attachments between the vehicle body panel and the first child seat tether anchor being disposed rearward of the transition between the supporting portion and the child seat connecting portion,
the first child seat tether anchor being directly fixedly attached to a substantially vertical surface of the structural support member.

10. The vehicle structure according to claim 9, wherein the vehicle body panel is fixedly attached to the substantially vertical surface of the structural support member.

11. A vehicle structure comprising:
a structural support member configured and arranged to be coupled to a vehicle body;
a vehicle body panel fixedly attached to the structural support member; and
a first child seat tether anchor fixedly attached to the structural support member, the first child seat tether anchor including a supporting portion being substantially horizontally oriented and supporting a lower surface of the vehicle body panel, a structural mounting portion extending substantially downwardly from one end of the supporting portion that is fixedly attached to a substantially vertical surface of the structural support member and a child seat connecting portion extending substantially upwardly from the other end of the supporting portion and projecting through a cutout in the vehicle body panel.

12. The vehicle structure according to claim 11, wherein the structural support member is a cross member that extends in a transverse direction relative to a longitudinal vehicle axis.

13. The vehicle structure according to claim 12, further comprising a second child seat tether anchor fixedly attached to the structural support member at a laterally spaced location from the first child seat tether anchor, the second child seat tether anchor including a second supporting portion supporting a lower surface of the vehicle body panel, a second child seat connecting portion projecting through a second cutout in the vehicle body panel and a second structural mounting portion fixedly attached to the structural support member.

14. The vehicle structure according to claim 11, wherein the supporting portion includes a planar surface making planar contact with a planar surface of the vehicle body panel.

15. The vehicle structure according to claim 11, wherein the child seat connecting portion is obtusely or acutely angled with respect to the supporting portion.

16. The vehicle structure according to claim 11, wherein the child seat connecting portion has an attachment hole defined by a continuous surface of the child seat connecting portion located above the vehicle body panel.

17. A vehicle structure comprising:
a structural support member configured and arranged to be coupled to a vehicle body;
a vehicle body panel including a lower surface and an upper surface, with the vehicle body panel fixedly attached to the structural support member; and
a first child seat tether anchor directly fixed to the structural support member at a point below the lower surface to form a cantilever attachment with respect to the structural support member, the first child seat tether anchor including a supporting portion directly contacting and supporting the lower surface of the vehicle body panel and a child seat connecting portion extending from the supporting portion and projecting through a cutout in the vehicle body panel,
the first child seat tether anchor being a one-piece, unitary plate member;
the first child seat tether anchor being directly fixedly attached to a substantially vertical surface of the structural support member.

18. The vehicle structure according to claim 17, wherein the structural support member includes a recess in which the supporting portion of the first child seat tether anchor is disposed.

19. A method of manufacturing a vehicle structure comprising:
fixedly attaching a first child seat tether anchor to a structural support member that is configured and arranged to be coupled to a vehicle body;
positioning a vehicle body panel directly on the first child seat tether anchor after the first child seat tether anchor is attached to the structural support member such that a supporting portion of the first child seat tether anchor supports a lower surface of the vehicle body panel and such that a child seat connecting portion of the first child seat tether anchor projects through a cutout in the vehicle body panel; and
fixedly attaching the vehicle body panel to the structural support member after the first child seat tether anchor is attached to the structural support member;
the first child seat tether anchor being directly fixedly attached to a substantially vertical surface of the structural support member.

20. The method according to claim 19, further comprising fixedly attaching the vehicle body panel directly to the first child seat tether anchor.

21. The method according to claim 19, wherein the attaching of the first child seat tether anchor to the structural support member is accomplished by metal bonding.

22. The method according to claim 19, wherein the attaching of the first child seat tether anchor to the structural support member is accomplished by attaching the first child seat tether anchor to a substantially vertical surface of the structural support member.

23. The method according to claim 22, wherein the attaching of the vehicle body panel to the structural support member is accomplished by attaching the vehicle body panel to the substantially vertical surface of the structural support member.

24. The method according to claim 23, further comprising fixedly attaching the vehicle body panel to the first child seat tether anchor.

25. The method according to claim 19, further comprising fixedly attaching a second child seat tether anchor to the structural support member at a laterally spaced location from the first child seat tether anchor such that a second supporting portion of the second child seat tether anchor supports the lower surface of the vehicle body panel and such that a second child seat connecting portion of the second child seat tether anchor projects through a second cutout in the vehicle body panel.

* * * * *